in United States Patent (10) Patent No.: US 8,716,429 B2
Spilman et al. (45) Date of Patent: May 6, 2014

(54) POLYESTER COIL COATING FORMULATION

(75) Inventors: Gary E. Spilman, Midland, MI (US); Scott J. Bis, Midland, MI (US); Paul J. Popa, Auburn, MI (US)

(73) Assignee: Dow Global Technologies LLC

( * ) Notice: Subject to any disclaimer, the term of this patent is extended or adjusted under 35 U.S.C. 154(b) by 725 days.

(21) Appl. No.: 12/523,333

(22) PCT Filed: Jan. 29, 2008

(86) PCT No.: PCT/US2008/052296
§ 371 (c)(1),
(2), (4) Date: Jul. 16, 2009

(87) PCT Pub. No.: WO2008/094898
PCT Pub. Date: Aug. 7, 2008

(65) Prior Publication Data
US 2010/0076154 A1    Mar. 25, 2010

Related U.S. Application Data

(60) Provisional application No. 60/898,617, filed on Jan. 31, 2007.

(51) Int. Cl.
*C08G 63/00*    (2006.01)

(52) U.S. Cl.
USPC ............ 528/307; 525/441; 528/271; 528/272

(58) Field of Classification Search
USPC ........... 524/601; 525/441; 528/271, 272, 274, 528/307, 308
See application file for complete search history.

(56) References Cited

U.S. PATENT DOCUMENTS

| 4,071,578 | A |   | 1/1978  | Lasher |
| 4,177,315 | A |   | 12/1979 | Ubersax |
| 4,348,462 | A |   | 9/1982  | Chung |
| 4,554,343 | A | * | 11/1985 | Jackson et al. ................. 528/274 |
| 4,578,453 | A |   | 3/1986  | Jackson, Jr. et al. |
| 4,600,768 | A |   | 7/1986  | Jackson, Jr. et al. |
| 4,775,732 | A |   | 10/1988 | Lapin |
| 5,017,679 | A |   | 5/1991  | Chang et al. |
| 5,019,636 | A |   | 5/1991  | Lapin et al. |
| 5,516,549 | A | * | 5/1996  | Jasenof et al. ................. 427/178 |
| 5,523,382 | A |   | 6/1996  | Beavers et al. |
| 5,552,512 | A |   | 9/1996  | Sublett |
| 5,576,397 | A |   | 11/1996 | Oberressl et al. |
| 5,773,554 | A |   | 6/1998  | Dickerson et al. |
| 5,972,471 | A |   | 10/1999 | Jasenof et al. |
| 6,077,917 | A | * | 6/2000  | Tachika et al. ................. 525/438 |
| 6,252,121 | B1 |  | 6/2001  | Argyropoulos et al. |
| 6,255,523 | B1 |  | 7/2001  | Panandiker et al. |
| 6,706,779 | B2 |  | 3/2004  | Bahadur et al. |
| 6,806,314 | B2 |  | 10/2004 | Fenn et al. |
| 6,897,265 | B2 |  | 5/2005  | Algrim et al. |
| 7,244,792 | B2 |  | 7/2007  | Agarwal et al. |
| 7,375,144 | B2 |  | 5/2008  | Gilmer |
| 7,687,594 | B2 |  | 3/2010  | Hung et al. |
| 2004/0132924 | A1 |   | 7/2004  | Weiss et al. |
| 2004/0151838 | A1 |   | 8/2004  | Fenn et al. |
| 2005/0227100 | A1 | * | 10/2005 | Brandenburger et al. .... 428/480 |
| 2005/0245711 | A1 |   | 11/2005 | Narayan-Sarathy et al. |
| 2009/0192286 | A1 | * | 7/2009  | Argyropoulos et al. ...... 528/307 |
| 2009/0198014 | A1 |   | 8/2009  | Baikerikar et al. |
| 2009/0253585 | A1 |   | 10/2009 | Diatchenko et al. |
| 2009/0253858 | A1 |   | 10/2009 | Argyropoulos et al. |

FOREIGN PATENT DOCUMENTS

| CA | 2548040    | 5/2006 |
| JP | 07304708   | 11/1995 |
| JP | 3374471    | 2/2003 |
| WO | 9416025    | 7/1994 |
| WO | 0132790    | 5/2001 |
| WO | 2004016426 | 2/2004 |
| WO | 2004039902 | 5/2004 |
| WO | 2004069892 | 8/2004 |

OTHER PUBLICATIONS

Heinemann, S et al., "Polyester for Production of Weather-Resistant Coatings by Coil-Coating," Derwent Abstract DE19753990, Accession No. 1999-338818.

Franzmann, G et al., Macropolyols Based on Polyester with Fluoro Containing Components, useful as e.g. Main Component in Coating Agents, Comprises Dicarboxylic Acid (e.g. Cycloaliphatic 1,2-dicarboxylic acid); and Alcohol (e.g. Trifunctionalized Alcohol), Derwent Abstract DE102004049070, Accession No. 2006-265077.

Ying, et al., "Studies on Crystallization Behaviors of 1,4-Cyclohexane Dimethanol Modified Polyethylene Terephthalate", Polymer Materials Science and Engineering, Jan. 2000, vol. 16, No. 1 p. 120-123.

Borman, Molecular Weight-Viscosity Relationships for Poly(1,4-butylene Terephthalate), Journal of Applied Polymer Science, vol. 22, 2119-2126 (1978).

Argyropoulos, et al., "UNOXOL TM Diol; A New Liquid Cycloaliphatic Diol for Coatings Applications", Paint & Coatings Industry, Jun. 2006, p. 1-5.

John Argyropoulous, et al. "A New Liquid Cycloaliphatic Diol for Coatings Applications", Proceedings of the 30th Int'l Waterborne, High-Solids, & Powder Coatings Symposium, Feb. 26-28, 2003, New Orleans, LA.

* cited by examiner

*Primary Examiner* — Ling Choi
*Assistant Examiner* — Wenwen Cai
(74) *Attorney, Agent, or Firm* — Paul D. Hayhurst

(57) ABSTRACT

In a curable coil coating composition comprising a mixture of: (a) a curable polyester that is a liquid at room temperature, (b) a cross-linking agent; and (c) a solvent; the improvement comprising preparing the polyester from a composition comprising a mixture of 1,3- and 1,4-cyclohexane dimethanol wherein the molar ratio of the 1,3 isomer to the 1,4 isomer is from about 60:40 to about 5:95. Cured coil coatings prepared from these compositions exhibit an excellent combination of flexibility and hardness.

14 Claims, No Drawings

POLYESTER COIL COATING FORMULATION

CROSS REFERENCE TO RELATED APPLICATIONS

This application is a 371 of PCT/US2008/052296 filed Jan. 29, 2008, which claims the benefit of U.S. Provisional Application Ser. No. 60/898,617, filed Jan. 31, 2007.

BACKGROUND OF THE INVENTION

The invention relates to polyester-containing coil coating compositions and a process for preparing them.

Coil coatings are applied to coiled sheet metal stock, such as steel or aluminum, in an economical, high-speed process. Coil coating is a continuous operation, with the end of one coil typically being attached to the beginning of the following coil to be coated. Important properties for coil coated metals include weatherability, water resistance, chemical resistance, scratch resistance, gloss, hardness, flexibility, and resistance to surface delamination or cracking upon bending of the substrate. The latter property is important since the coated metal typically is subjected to a forming step during the preparation of end use articles.

Many coil coating compositions are known to those skilled in the art. However, formulation of coil coating compositions involves a trade-off wherein improved flexibility is only attained at the expense of hardness, and vice versa. U.S. Pat. No. 6,897,265 B2 shows at least one example of a coil coating composition having a Pencil Hardness of at least 2H and a T-bend test value of 0T. However, this result is only obtained by using a blend of a branched polyester and a linear polyester. It would be desirable to have a simplified coil coating composition that could be used to prepare coatings having an excellent combination of hardness and flexibility.

SUMMARY OF THE INVENTION

The composition of the invention is such a composition and includes a mixture of:
(a) a curable polyester that is a liquid at room temperature,
(b) a cross-linking agent; and
(c) a solvent;
wherein the polyester is prepared using a polyol comprising a mixture of 1,3- and 1,4-cyclohexane dimethanol wherein the ratio of the 1,3 isomer to the 1,4 isomer is from about 60:40 to about 5:95.

In another aspect, the invention is a process for preparing an improved polyester coil coating composition, wherein a polyester is prepared by a process wherein a monomer comprising a diol is reacted with a monomer comprising a polyfunctional acid, the process comprising employing as the diol a composition comprising a mixture of 1,3- and 1,4-cyclohexane dimethanol wherein the ratio of the 1,3 isomer to the 1,4 isomer is from about 60:40 to about 5:95.

Surprisingly, the coil coating composition of the invention exhibits an outstanding combination of flexibility and hardness.

DETAILED DESCRIPTION OF THE INVENTION

The composition of the invention includes a curable polyester, a cross-linking agent, and a solvent.

As used herein, the term "polyol" means a compound with at least 2 hydroxyl groups. As used herein, the term "diol" means a compound with 2 hydroxyl groups. As used herein, the term "polyacid" means a compound with at least 2 carboxylic acid groups, and the term "diacid" means a compound with 2 carboxylic acid groups.

Polymers comprising a polyester unit usually are prepared from the condensation of monomers comprising a diacid and/or a polyacid and a diol and/or a polyol. Polyesters which may be employed in the coating formulations of this invention are polymerized from a composition comprising a mixture of 1,3- and 1,4-cyclohexane dimethanol wherein the molar ratio of the 1,3 isomer to the 1,4 isomer is from about 60:40 to about 5:95.

Preferred polyesters advantageously exhibit a number average molecular weight of at least about 1,000, preferably from about 2,000 to about 10,000, and most preferably from about 2,500 to about 7,500. In one embodiment of the invention, the number average molecular weight is at least about 4,000. The glass transition temperature, or Tg, of the polyester advantageously is from about $-20°$ C. to about $100°$ C., preferably is from about $-10°$ C. to about $90°$ C., and more preferably is from about $0°$ C. to about $40°$ C. The preferred polyesters generally have a Tg of less than about $55°$ C. The polyester preferably is a viscous liquid at $25°$ C. For the purposes of the invention, Tg is measured by differential scanning calorimetry.

The hydroxyl number of the polyester advantageously is less than about 150 mg KOH/g. Preferably, the hydroxyl number of the polyester is from about 10 to about 100 mg KOH/g. More preferably, the hydroxyl number of the polyester is from about 20 to about 70 mg KOH/g. Most preferably, the hydroxyl number of the polyester is from about 30 to about 50 mg KOH/g. The polyester of the invention advantageously has no more than about 2 hydroxyl groups per molecule.

Preferably, the polyester is hydroxyl- or carboxyl-terminated. Advantageously, a cured coating comprising the composition in cured form has a pencil hardness of at least 2H and a T bend value of 0T.

The amount of polyester employed in the coil coating composition of the invention advantageously is from about 20 to about 90 weight percent, based on the weight of polyester, cross-linker and solvent in the composition, preferably, is from about 25 to about 70 weight percent, and most preferably is from about 30 to about 60 weight percent. In one embodiment of the invention, the polyester is substantially free of reactive diluent.

The polyol composition employed in the invention comprises a mixture of 1,3- and 1,4-cyclohexane dimethanol wherein the ratio of the 1,3 isomer to the 1,4 isomer is from about 60:40 to about 5:95. Advantageously, the polyol composition comprises at least about 10 weight percent of the 1,3- and 1,4-cyclohexane dimethanol mixture, and preferably is at least about 30 weight percent of the 1,3- and 1,4-cyclohexane dimethanol mixture, based on the weight of polyols in the polyol composition. In one embodiment of the invention the polyol composition comprises at least about 90 weight percent of the 1,3- and 1,4-cyclohexane dimethanol mixture. In one embodiment of the invention, the polyol composition comprises from about 30 to about 70 weight percent of the 1,3- and 1,4-cyclohexane dimethanol mixture.

Mixtures of 1,3- and 1,4-cyclohexane dimethanol are known in the art and can be prepared, e.g., according to the teachings of U.S. Pat. No. 6,252,121. A mixture of 1,3- and 1,4-cyclohexane dimethanol having various ratios of cis to trans isomers can be made by distilling UNOXOL brand diol (a mixture of cis and trans 1,3- and 1,4-cyclohexane dimethanol available from The Dow Chemical Company) to produce a distilled fraction and a residue fraction.

The above-described polyol optionally can be employed in conjunction with one or more additional polyols. In one embodiment of the invention, the additional polyol generally contains more than 2, preferably 2 to about 10 carbon atoms, more preferably about 2 to 8 carbon atoms, in addition to having 2 to about 6, preferably 2 to about 4, hydroxyl groups. Some preferred examples of the additional polyols are one or more of the following: neopentyl glycol; ethylene glycol; propylene glycol; butanediol; hexamethylenediol; 1,2-cyclohexanedi-methanol; trimethylol propane; pentaerythritol; neopentyl glycol hydroxypivalate diethylene glycol; triethylene glycol; tetraethylene glycol; dipropylene glycol; polypropylene glycol; hexylene glycol; 2-methyl2-ethyl1,3-propanediol; 2-ethyl-1,3-hexanediol; 1,5-pentanediol; thiodiglycol; 1,3-propanediol; 1,3-butanediol; 2,3-butanediol; 1,4-butanediol; 2,2,4-trimethyl 1,3-pentanediol; 1,2-cyclohexanediol; 1,3-cyclohexanediol; 1,4-cyclohexanediol; glycerol; trimethylolpropane; trimethylolethane; 1,2,4-butanetriol; 1,2,6-hexanetriol; dipentaerythritol; tripentaerythritol; mannitol; sorbitol; methylglycoside; like compounds apparent to those skilled in the art; and mixtures thereof.

The polyol composition advantageously comprises at least one polyol having at least 3 hydroxyl groups. In one embodiment of the invention, the amount of this compound is from about 0.1 to about 5 weight percent, based on the weight of the polyol composition.

The polyacid contains about 2 to 34 carbon atoms in aliphatic or aromatic moieties, and at least 2, preferably no more than 4, carboxyl groups which may, alternatively, be present in the form of anhydride groups. The polyacids are preferably one or more of the following: phthalic anhydride, terephthalic acid, isophthalic acid, adipic acid, succinic acid, glutaric acid, fumaric acid, maleic acid, cyclohexane dicarboxylic acid, trimellitic anhydride, azeleic acid, sebacic acid, dimer acid, pyromellitic dianhydride, substituted maleic and fumaric acids such as citraconic, chloromaleic, mesaconic, and substituted succinic acids such as aconitic and itaconic. Mixtures of polyols or polyacids or both can be employed.

In one embodiment of the invention, termination of the polyester molecules by hydroxy-containing monomers is provided by using a molar excess of the diol in the polyester-forming reaction. In another embodiment of the invention, termination is provided by incorporating a monofunctional acid or alcohol into the polymerization mixture. In another embodiment of the invention, termination of the polyester molecules by carboxyl containing monomers is provided by using a molar excess of a di- or tri-carboxylic acid in the polyester-forming reaction.

Polyesters exhibiting good flexibility properties when cured are preferably prepared using aliphatic or mixed aliphatic/aromatic reactants on the acid side. Preferred of such polyesters are the hydroxy terminated condensation products of adipic acid, a mixture of 1, 3- and 1,4-cyclohexane dimethanol wherein the ratio of the 1,3 isomer to the 1,4 isomer is from about 60:40 to about 5:95 as the polyol, and phthalic, isoptahlic, terephthalic acids and/or phthalic anhydride.

As is well known to those skilled in the art, the esterification reactions are normally carried out at temperatures of from about 140° to about 260° C., or even up to about 300° C., for a period of time ranging from about 3 to about 15 hours, with or without the use of acidic esterification catalysts such as phosphorous acid or toluene sulfonic acid present at a level of about 0.01 up to about 2.0 wt. %. The reaction is optionally carried out in the presence of a solvent. In one embodiment of the invention, the reaction is conducted in the substantial absence of a solvent. When present, the solvent is preferably an aromatic hydrocarbon. The esterification may be carried out using a single or multi-stage process.

Amino-crosslinking agents which are useful in preparing thermoset coating formulations are those materials which will classically react with the hydroxyl terminal groups of the polyester. Such materials are well known to those skilled in the art. Suitable materials include, for example, butylated or methylated urea-formaldehyde resins, butylated melamine-formaldehyde resins, hexamethoxymethylmelamine or mixtures of various hydroxymethyl-melamine-methyl ethers such as the pentamethyoxymethylmelamine and the tetramethoxymethyl melamines, and high-amino/polymeric melamines. The hydroxymethylmelamine and hydroxymethyl ureas may also be etherified with alcohols other than methyl or butyl such as ethyl, propyl, isobutyl and isopropyl. Mixtures of crosslinking agents can be employed.

The amount of crosslinking agent on a weight basis incorporated into the final coating composition advantageously is from about 2 up to about 35% by weight, based on the combined weight of polyester, cross-linking agent and solvent present in the coating composition. The most preferred level of addition is from about 3 to about 20% by weight.

The lower the molecular weight of the polyester polymer, the larger the number of terminal hydroxy groups present and the larger the quantity of crosslinking agent required to properly cure the resin. Conversely, the higher the molecular weight of the polyester polymer, the fewer the number of terminal hydroxy groups and the lesser the quantity of crosslinking agent required to properly cure the resin.

Advantageously, the composition of the invention is employed as a solution in a solvent. The solvent can be any solvent which will dissolve or disperse the polyester and the cross-linking agent. The same or different solvent(s) which are optionally used during the synthesis of the polyester to dissolve reactants may also be added during the formulation of the coating composition to adjust viscosity so as to provide a formulation suitable for coating, the coating composition preferably having a viscosity of from about 10 centipoise to about 10 poise. In many cases, a single solvent is used to solubilize the system. However, in other cases it is often desirable to use mixtures of solvents in order to effect the best solubilization, and in particular a combination of an aromatic solvent with an oxygenated solvent is preferred. Suitable aromatic solvents include toluene, xylene, ethylbenzene, tetralin, naphthalene, and solvents which are narrow cut aromatic solvents comprising $C_8$ to $C_{13}$ aromatics such as those marketed by Exxon Company U.S.A. under the name Aromatic 100, Aromatic 150, and Aromatic 200. The oxygenated solvents should not be extremely polar such as to become incompatible with the aromatic solvents. Suitable oxygenated solvents can be selected from the following classes: alcohols, ketones, ethers, ether-alcohols, and ether-esters, or any mixture of these. Examples of suitable oxygenated solvents include propylene glycol monomethyl ether acetate, propylene glycol propyl ether acetate, ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, diethylene glycol monoethyl ether acetate, dibasic ester (a mixture of esters of dibasic acids marketed by DuPont), ethyl acetate, n-propyl acetate, isopropyl acetate, butyl acetate, isobutyl acetate, amyl acetate, isoamyl acetate, mixtures of hexyl acetates such as those sold by Exxon Chemical Company under the brand name Exxate 700, acetone, methyl ethyl ketone, methyl isobutyl ketone, methyl amyl ketone, methyl isoamyl ketone, methyl heptyl ketone, isophorone, isopropanol, n-butanol, sec-butanol, isobutanol, isopropanol, amyl alcohol, isoamyl alcohol, hexanols, and heptanols. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from about 5 to about 75% by weight with a preferred range of from about 7 to about 50% by weight and a most preferred range of from about 10 to about 40% by weight.

Acid catalysts may be used to cure systems containing hexamethoxymethyl melamine and other amino crosslinking agents, and a variety of suitable acid catalysts are known to one skilled in the art for this purpose, and are optionally employed in the composition of the invention. These include, for example, p-toluene sulfonic acid, methane sulfonic acid, nonylbenzene sulfonic acid, dinonylnapthalene disulfonic acid, dodecylbenzene sulfonic acid, phosphoric acid, mono and dialkyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc. products with the tradename K-CURE. Examples of blocked catalysts are the King Industries, Inc. products with the tradename NACURE.

In some cases, carboxylic acids can be used as catalysts for the crosslinking reaction. At the higher temperatures used for coil coating, the activity of the residual carboxylic groups on the backbone polymer can sometimes provide sufficient catalysis to promote the crosslinking reaction.

The amount of catalyst employed typically varies inversely with the severity of the baking schedule. In particular, smaller concentrations of catalyst are usually required for higher baking temperatures or longer baking times. Typical catalyst concentrations for coil coating applications (204-260° C. peak metal temperatures) would be about 0.1 to about 0.6 wt. % catalyst solids based on the weight of binder (polymer plus crosslinking agent solids), more preferably from about 0.2 to about 0.5 wt. %. Higher concentrations of catalyst up to about 1 wt. % may be employed for cures at lower temperature or shorter times. For certain catalysts, such as phosphoric acid and the phosphate esters, an even wider range of catalyst concentration up to 3% or more can be used.

For formulations of this invention containing hexamethoxymethyl melamine as the crosslinking agent and p-toluene sulfonic acid as the catalyst, preferred curing conditions at dry film thickness of about 1 mil are catalyst concentration between about 0.1 and 0.6 wt. % based on binder, peak metal temperature from about 150° C., to about 260° C., more preferably from about 177° C. to about 260° C., and baking time between about 5 seconds and about 60 minutes.

The quantity of catalyst used also has an upper practical limit. While increasing catalyst helps to increase crosslinking, an excess of catalyst can be detrimental. Residual catalyst in the finished coating can catalyze undesirable degradation reactions. The upper limit of the catalyst also depends on the coating used, and on the specific application.

The polyester coating compositions of this invention have excellent flexibility and hardness and can be specifically formulated with high loadings of pigment, generally at a weight ratio within the range of from about 1.25 to 1 up to about 5.0 to 1 pigment to polymer solids ratio. Suitable pigments which may be included in the compositions of this invention are those opacifying pigments normally used in coil coating formulations and include titanium dioxide, zirconium oxide, zircon, zinc oxide, iron oxide, antimony oxide, carbon black, as well as chrome yellows, greens, oranges and the like. Preferred pigments include rutile $TiO_2$ and particularly weather resistant coated types of $TiO_2$. The pigments may also be blended with a suitable extender material which does not contribute significantly to hiding power. Suitable extenders or fillers include silica, barite, calcium sulfate, magnesium silicate (talc), aluminum oxide, aluminum silicate, calcium silicate, calcium carbonate, mica, potassium aluminum silicate and other clays or clay-like materials.

The more preferred pigment/extender to binder weight loading ratios lie within the range of from about 1.5 to about 5.0, more preferably from greater than about 2.0 to about 4.75, and most preferably from about 2.25 to about 4.5 parts of pigment, or pigments and extender mixture, per part of binder.

The coil coating composition of the invention can comprise conventional additives such as anti-settling agents, anti-foaming agents, wetting agents, leveling agents, reactive diluents, plasticizers, thickeners, rheology and/or surface modifiers, UV absorbers, catalysts for crosslinking, and the like. Para-toluene sulfonic acid can be employed as a catalyst for aminoplast curing. Examples of catalysts for isocyanate curing include tin compounds, such as dibutyl tin dilaurate, and amine catalysts such as triethylamine. These conventional additives can be employed according to techniques well known to those skilled in the art.

The coating compositions of the invention may be applied to substrates by any suitable conventional technique such as spraying, roller coating, dip coating and the like. The coating composition is applied in liquid form.

The solids content of the coating composition can vary widely at the discretion of the user. Advantageously, the coating composition of the invention has a solids content of from about 25 to about 95 weight percent. In one embodiment of the invention, the coating composition of the invention has a solids content of less than about 85% by weight. In one embodiment of the invention, the coating composition of the invention has a solids content of at least about 50% by weight, and in a preferred embodiment of the invention, the composition has a solids content of at least about 75% by weight.

Satisfactory baking schedules for formulations of the present invention vary widely including, but not limited to, low temperature bakes of about 20 to 30 minutes at temperatures between 90° C. to 105° C. for large equipment applications, and high temperature bakes of about 5 to 10 seconds in 315° C. to 371° C. air temperature for coil coating applications. Generally speaking, sufficient baking in coil coating applications is achieved when the actual temperature of the underlying metal reaches at least 350° C., and more preferably at least 200° C. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Required baking schedules also depend on the type and concentration of catalysts added to the formulations and on the thickness of the applied coating film. In general, thinner films and coatings with higher concentrations of catalyst cure more easily, i.e., at shorter baking times and/or lower temperatures.

The compositions of this invention may also be blended with other crosslinkable polymer materials to improve the physical and chemical properties of those materials. Examples of suitable blend polymers include acrylic and methacrylic polymers and copolymers, epoxy resins, alkyd resins, epoxy/phenolic resins, epoxy/acrylic resins, aromatic and aliphatic urethane polymers, chlorinated rubber, cellulose esters and other polyester resins. Respective weight blend ratios of 1:20 to 20:1 may be used.

SPECIFIC EMBODIMENTS OF THE INVENTION

The following examples are given to illustrate the invention and should not be construed as limiting its scope. All parts and percentages are by weight unless otherwise indicated. Dry film thickness is abbreviated as "DFT" hereinafter.
Test Methods
T-Bend
T-bend values are measured according to ASTM D 4585-92.
Film Thickness
A minimum of 5 readings are taken and averaged using a Positector 6000 from DeFelsko Corporation, New York.
Cross-Hatch Adhesion
ASTM D3359 (cross-hatch adhesion) is used to measure the adhesion of the coatings and rated according to the ASTM guidelines.
Solvent Resistance—Double Rubs
ASTM D5402 using methyl ethyl ketone is used to determine the solvent resistance. The number of double rubs is recorded when degradation or delamination of the film is observed. The test is stopped at 200 double rubs if no effect on the coating is observed.
Pencil Hardness
Pencil hardness is measured according to ASTM D3363
Impact
Impact resistance of the coating is determined by using a Gardner impact tester according to the method of ASTM D 2794.
Pendulum Hardness
Pendulum hardness of the coating is measured by using a Konig pendulum hardness tester and reporting the value in seconds.
Microhardness
The microhardness is measured on the cured coatings using a FISCHERSCOPE H100C used in conjunction with WIN-HCU control software, both from Fischer Technology, Connecticut. The Vickers indenter is used at an applied force of 5 mN (rate=5 mN/20 seconds). By taking into account the geometry of the indenter and the penetration depth for the applied force the Universal Hardness (UH), Vicker's Hardness, modulus, and indentation depth (um) are obtained.
Raw Materials
Neopentyl glycol (NPG)
Dow Corning 3074 silicone intermediate (a methoxy-functional, low molecular weight, reactive silicone which reacts with hydroxyl groups)
Trimethylolpropane (TMP)
Isophthalic acid (PIA)
Terephthalic acid (TA)
UNOXOL brand diol is available from The Dow Chemical Company (UNOXOL)

Cymel 303 crosslinker (hexamethoxymethylmelamine—98% wt) and Cycat 4040 catalyst (solution of toluene sulfonic acid in isopropanol—40% weight active catalyst) brands are available from Cytec
DOWANOL PMA (propylene glycol methyl ether acetate) is available from The Dow Chemical Company
UCAR n-butyl propionate is available from The Dow Chemical Company
n-butanol and butyl acetate are available from Fisher Scientific

EXAMPLES

Comparative Experiment 1 (Not an Embodiment of the Invention)

A mixture is prepared from NPG, TMP, PIA and TA in the amounts listed in Table A. The mixture is heated such that the overhead temperature does not exceed 100° C. Condensation is carried out at from 160° to 210° C. until the content of acid groups achieved is measured at an acid value of 5-8 mg KOH/g polyester. The resulting polymer is diluted with 380 g of DOWANOL PMA. Coatings are prepared from the resulting diluted polymer (Polymer 1) using the following coating procedure.

A solvent blend is prepared by adding to a bottle Dowanol PMA, n-butyl propionate, n-butanol, and butyl acetate in the proportions given in the following table and mixing until homogenous.

| Material | Wt % |
| --- | --- |
| DOWANOL PMA | 35 |
| n-butyl propionate | 39 |
| n-butanol | 13 |
| butyl acetate | 13 |

The polymer, solvent blend, Cymel 303, and Cycat 4040 (if present) are added to a bottle in the amounts shown in the "Wt. %" column of Table A, and are mixed by hand with a spatula until homogenous to form a coating composition having 70% solids.

The coating composition is applied to 0.025"×4"×12" (0.06×10.16×30.48 cm) chromate pretreated aluminum panels and phosphate pre-treated steel panels using a #28 wire wound rod to form coated panels. The panels are pre-cleaned by wiping with a lint free cloth and isopropanol to remove oils and are dried with compressed air. The coatings are cured at 200° C. for 10 minutes. The physical properties of the coatings are listed in Table B.

Example 1

The procedure of Comparative Experiment 1 is repeated, except that UNOXOL, in the amount shown in Table A, is used instead of NPG, the resulting polymer is diluted with 414 g of DOWANOL PMA. and the amount of solvent blend in the coating formulation is slightly different in order to obtain a coating composition having 70% solids.

As shown in Table B, incorporation of UNOXOL diol in the polymer increases the solvent resistance (MEK 2× rubs) hardness (Universal Hardness. Vickers, Konig, and Pencil), and impact resistance (direct and indirect) while maintaining the flexibility (T-bend).

Comparative Experiment 2

Comparative Experiment 1 is repeated, except that the amounts of materials employed are as shown in Table A, the resulting mixture is cooled to 140° C. following the initial condensation, then the Dow Corning silicone is added in the amount shown in Table A and the mixture is heated to 150° C. to remove methanol from the resulting alkoxysilane. The chemical modification is complete when the determination of 5 separate phases is not observable on glass by placing a thin film of the reaction mixture on glass and observing for a slightly hazy unreacted secondary phase. Upon complete conversion by this method (2 hours) the mixture is then cooled to 80° C. and 300 g of butanol are added.

Coatings are prepared from the resulting mixture using the formulation shown in the "Wt. %" column of Table A, and the physical properties of the coatings are listed in Table B.

Examples 2 and 3

The procedure of Comparative Experiment 2 is repeated, except that the polymer and coating compositions are varied as shown in Table A.

As can be seen from the coating physical properties in Table B, the incorporation of the UNOXOL diol in the polymer increases the solvent resistance (MEK 2× rubs) and hardness (Universal Hardness. Vickers, Konig, and Pencil) while maintaining the flexibility (T-bend). The use of a catalyst in the coating formulation further enhances the solvent resistance (MEK 2× rubs) and hardness (Universal, Vickers, Konig, and Pencil).

TABLE A

| | | NPG | TMP | UNOXOL | Adipic acid | Phthalic anhydride | Dow Corning Silicone | % Solids | Wt. % |
|---|---|---|---|---|---|---|---|---|---|
| C.E. 1 | Polymer 1 | 208.3 | 268.4 | 0 | 109.6 | 370.3 | 0 | 70.8 | 89 |
| | Solvent Blend | | | | | | | 0 | 3.6 |
| | Cymel 303 | | | | | | | 98 | 7.2 |
| | Cycat 4040 | | | | | | | 40 | 0.2 |
| | Formulation Solids | | | | | | | 70 | |
| Ex. 1 | Polymer 2 | 0 | 268.4 | 288.4 | 109.6 | 370.3 | 0 | 72.5 | 86.9 |
| | Solvent Blend | | | | | | | 0 | 5.7 |
| | Cymel 303 | | | | | | | 98 | 7.2 |
| | Cycat 4040 | | | | | | | 40 | 0.2 |
| | Formulation Solids | | | | | | | 70 | |
| C.E. 2 | Polymer 3 | 208.3 | 268.4 | 0 | 109.6 | 370.3 | 410.3 | 69.6 | 70.4 |
| | Solvent Blend | | | | | | | 0 | 8.2 |
| | Cymel 303 | | | | | | | 98 | 21.4 |
| | Formulation Solids | | | | | | | 70 | |
| Ex. 2 | Polymer 4 | 0 | 268.4 | 288.4 | 109.6 | 370.3 | 468.4 | 67.6 | 72.5 |
| | Solvent Blend | | | | | | | 0 | 6.1 |
| | Cymel 303 | | | | | | | 98 | 21.4 |
| | Formulation Solids | | | | | | | 70 | |
| Ex. 3 | Polymer 4 | 0 | 268.4 | 288.4 | 109.6 | 370.3 | 468.4 | 67.6 | 72.5 |
| | Solvent Blend | | | | | | | 0 | 5.9 |
| | Cymel 303 | | | | | | | 98 | 21.4 |
| | Cycat 4040 | | | | | | | 40 | 0.2 |
| | Formulation Solids | | | | | | | 70 | |

Note that the solvent employed with a given polymer (prior to the addition of the solvent blend) are not listed in Table A.

TABLE B

| | C.E. 1: No Cat | Ex. 1: No Cat | C.E. 2: No Cat | Ex. 2: No Cat | Ex. 3: Catalyst |
|---|---|---|---|---|---|
| Coating Physical Properties | No UNOXOL/ No Si | UNOXOL/ No Si | No UNOXOL/ Si | UNOXOL/ Si | UNOXOL/ Si |
| Universal Hardness (M/mm²) | 116 | 153 | 30.2 | 97 | 165 |
| Std Dev (UH) | 2.46 | 0.86 | 1.56 | 2 | 2.16 |
| Vickers Hardness | 9.1 | 14.7 | | 7.6 | 18.8 |
| Modulus (GPa) | 10.3 | 5.5 | | 7.8 | 4.5 |
| Indentation depth (um) | 1.11 | 0.96 | 2.26 | 1.22 | 0.92 |
| DFT mils (Avg) | 0.99 | 1.09 | 0.99 | 0.92 | 0.9 |
| Pencil Hardness | H | 3H | H | 2H | 2H-3H |
| X-Hatch Adhesion | 5B | 5B | 5B | 5B | 5B |
| MEK 2x rubs | 15 | 40 | 10 | 25 | >200 |
| Steel Panel | | | | | |
| DFT (mils) Avg | 1.08 | 1.12 | 1.05 | 1.1 | 1.02 |
| Konig Hardness | 199 | 213 | 135 | 190 | 207 |
| Impact Resistance | | | | | |
| Direct | 75 | 80 | 200 | 200 | 130 |
| Indirect | 0 | 8 | 200 | 200 | 25 |
| T-bend | 0T | 0T | 0T | 0T | 0T |

What is claimed is:

1. A curable coil coating composition comprising a mixture of:
   (a) a curable polyester that is a liquid at room temperature,
   (b) a cross-linking agent; and
   (c) a solvent;
       wherein the number average molecular weight of the polyester is from about 2,500 to about 7,500, wherein the hydroxyl number of the polyester is from about 10 to about 100 mg KOH/g, wherein the Tg of the polyester is from 0 to 100° C., wherein the polyester comprises, in polymerized form, a diol mixture consisting essentially of 1,3- and 1,4-cyclohexane dimethanol wherein the molar ratio of the 1,3 isomer to the 1,4 isomer is from about 60:40 to about 5:95, wherein the composition is substantially free of a reactive diluent comprising 1,3- and 1,4-cyclohexane dimethanol, and wherein a cured coating comprising the composition in cured form can have a pencil hardness of at least 2H and a T bend value of 0T.

2. The composition of claim 1 wherein the polyester is hydroxyl- or carboxyl-terminated.

3. The composition of claim 1 wherein the solids content is less than about 70 weight percent.

4. The composition of claim 1 wherein the polyester comprises, in polymerized form, at least one aromatic dicarboxylic acid monomer.

5. The composition of claim 1 comprising from about 20 to about 90 weight percent of the polyester, from about 2 to about 35 weight percent of the cross-linking agent and about 5 to about 75 weight percent of the solvent, based on the total weight of polyester, agent, and solvent, with the proviso that the total percentage equals 100.

6. The composition of claim 1 wherein the solids content is from about 25 to about 95 weight percent.

7. The composition of claim 6 wherein the solids content is at least 85 weight percent.

8. The composition of claim 1 wherein the Tg of the polyester is from 0 to 40° C.

9. A process for preparing an improved polyester coil coating composition, wherein a polyester being a liquid at room temperature and having a number average molecular weight of from about 2,500 to about 7,500, a hydroxyl number of from about 10 to about 100 mg KOH/g and a Tg of from 0 to 100° C. is prepared by a process wherein a polyhydroxy monomer comprising a diol is reacted with a monomer comprising a polyfunctional acid, the process comprising employing as the diol a diol composition consisting essentially of a mixture of 1, 3- and 1,4-cyclohexane dimethanol wherein the ratio of the 1,3 isomer to the 1,4 isomer is from about 60:40 to about 5:95, and wherein the coil coating composition is substantially free of a reactive diluent comprising 1,3- and 1,4-cyclohexane dimethanol, and wherein a cured coating comprising the composition in cured form can have a pencil hardness of at least 2H and a T bend value of 0T.

10. The process of claim 9 wherein the polyester is hydroxyl- or carboxyl-terminated.

11. The process of claim 9 wherein the solids content is less than about 70 weight percent.

12. The process of claim 9 wherein the polyester comprises, in polymerized form, at least one aromatic dicarboxylic acid monomer.

13. The process of claim 9 comprising from about 20 to about 90 weight percent of the polyester, from about 2 to about 35 weight percent of the cross-linking agent and about 5 to about 75 weight percent of the solvent, based on the total weight of polyester, agent, and solvent, with the proviso that the total percentage equals 100.

14. The process of claim 9 wherein the Tg of the polyester is from 0 to 40° C.

* * * * *